(12) United States Patent
Krippelz, Sr.

(10) Patent No.: US 6,231,217 B1
(45) Date of Patent: May 15, 2001

(54) WATERCRAFT ILLUMINATION SYSTEM AND METHOD

(76) Inventor: Jacob Krippelz, Sr., 1121 Lebanon St., Aurora, IL (US) 60505

( * ) Notice: Subject to any disclaimer, the term of this patent is extended or adjusted under 35 U.S.C. 154(b) by 0 days.

(21) Appl. No.: 09/271,197

(22) Filed: Mar. 17, 1999

(51) Int. Cl.$^7$ ................................................ B60Q 1/00
(52) U.S. Cl. ............................................. 362/477; 114/15
(58) Field of Search ........................... 362/477, 84, 234, 362/236, 276, 457; 340/984, 985; 116/26, DIG. 43

(56) References Cited

U.S. PATENT DOCUMENTS

| | | | |
|---|---|---|---|
| 2,300,067 | * 10/1942 | Schwab | 114/15 |
| 3,781,853 | * 12/1973 | Jacobs | 340/985 |
| 4,556,862 | * 12/1985 | Meinershagen | 340/478 |
| 5,335,149 | 8/1994 | Evans | 362/477 |
| 5,416,670 | * 5/1995 | Authier | 362/34 |
| 5,446,345 | 8/1995 | Halabi et al. | 315/200 A |
| 5,495,401 | 2/1996 | Evans | 362/477 |
| 5,613,886 | 3/1997 | Cribbs | 440/2 |
| 5,636,916 | 6/1997 | Sokolowski | 362/477 |
| 5,711,591 | 1/1998 | Jordan | 362/477 |

* cited by examiner

Primary Examiner—Sandra O'Shea
Assistant Examiner—Hargobind S. Sawhney
(74) Attorney, Agent, or Firm—Ryndak & Suri

(57) ABSTRACT

A lighting system for a watercraft which provides a visual indication of the watercraft at a distance during darkness or other inclement conditions. The lighting system comprises a light source or a plurality of light sources which are directed to directly illuminate the hull of the watercraft such that a distinct portion or portions of the hull is directly illuminated and visually identifiable at a distance. Preferably, the port side of the hull is directly illuminated by a red light, the starboard side of the hull is illuminated green and the stern portion of the hull is illuminated yellow so that one observing the watercraft can determine the correct orientation of the watercraft relative to the observer's position. The light source which directly illuminates the hull of the watercraft is also designed to intermittently flash or strobe based upon the movement of the watercraft, or lack thereof.

22 Claims, 3 Drawing Sheets

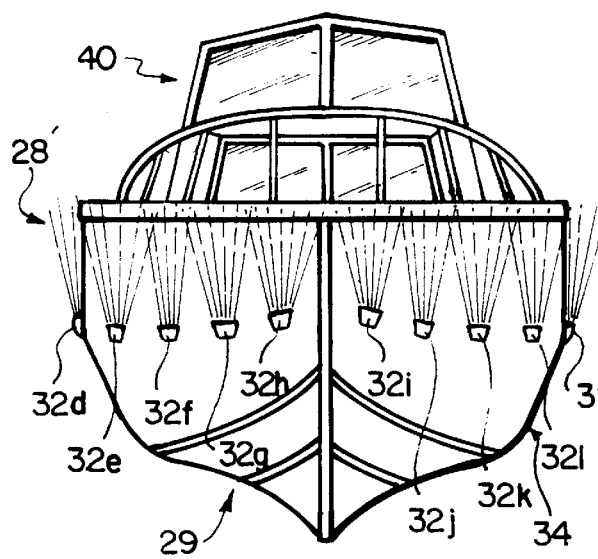
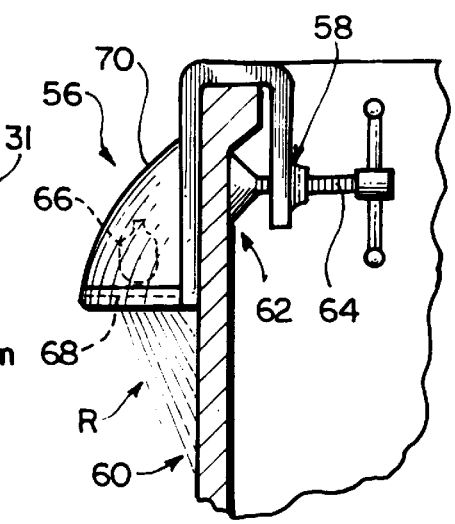
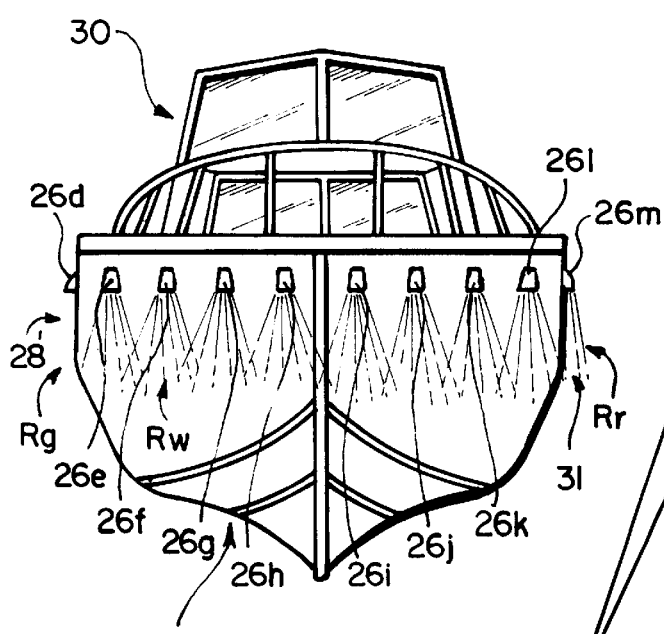
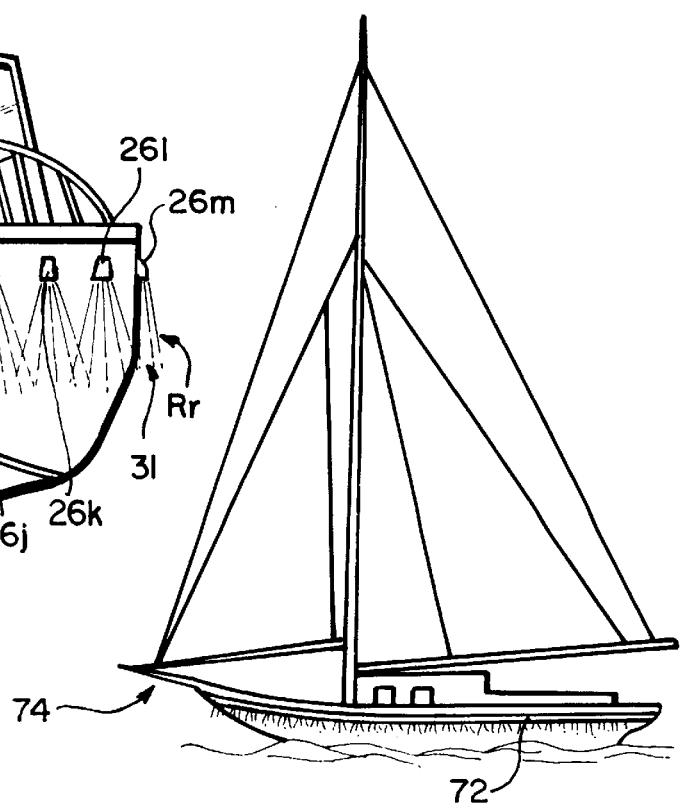

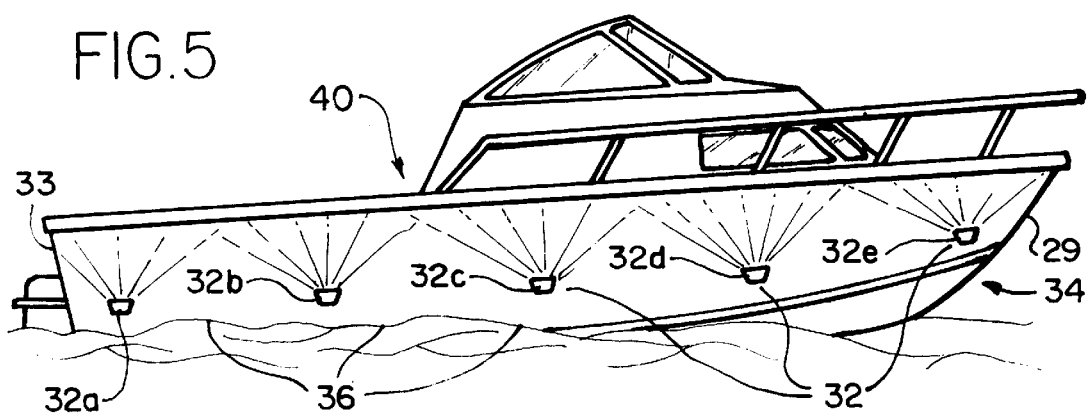
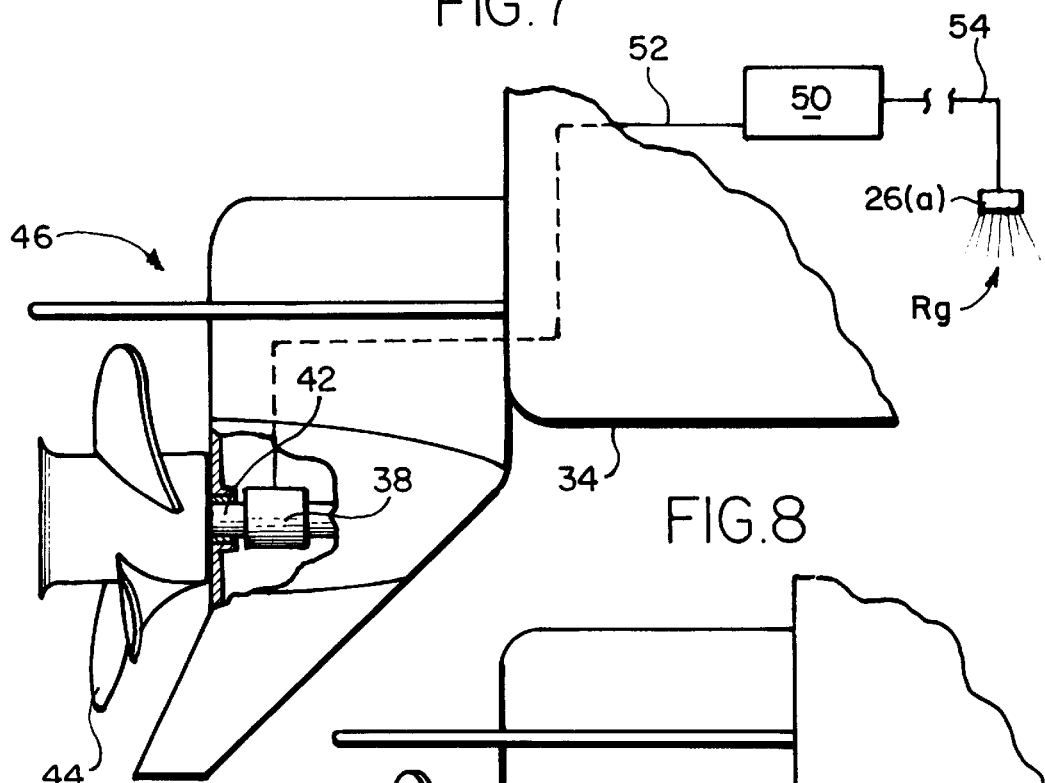
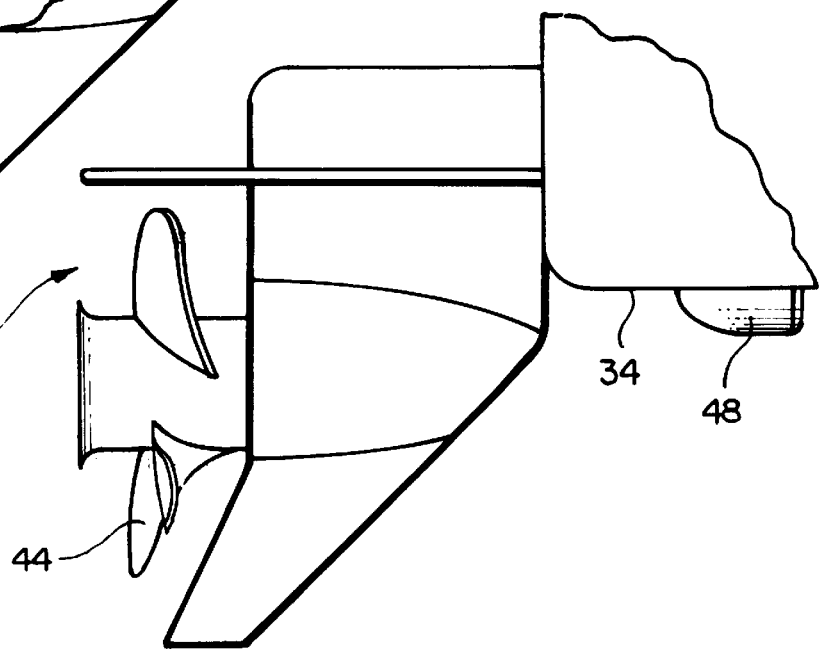

WATERCRAFT ILLUMINATION SYSTEM AND METHOD

FIELD OF THE INVENTION

The invention generally relates to watercraft lighting systems and methods, and more particularly to lighting systems and methods for watercraft which provide a visual indication of a watercraft at a distance.

BACKGROUND OF THE INVENTION

With the increased usage of boats and other watercraft, more dangerous boating conditions have been created by the higher density of traffic on bodies of water used for navigation and recreation. This heightened activity on waterways has likewise increased the need for safety devices which help to alleviate the problems. These safety concerns are particularly important for those engaging in watercraft activity during twilight, nighttime, and inclement weather conditions due to decreased visibility and the need for elevated levels of awareness.

This need for increased safety has been recognized by governments and their almost universal legislative mandates requiring navigational lights on watercraft. Typical conventional navigational running lights consist of a single light located at the bow of the boat having a green lens on the starboard side and a red lens on the port side of the boat and a single light located at the stern of the boat. Unfortunately, this precautionary effort by government has proven inadequate as the number of accidents involving watercraft continues to occur with regularity. The resulting cost in human and material resources is significant.

Many reasons exist to explain the causes of these accidents, but most reasons involve the low visibility of watercraft at night even though these watercraft are properly equipped with required navigational running lights. A shortcoming of conventional navigational lights mounted on watercraft is that these conventional lighting systems do not readily allow watercraft operators to determine the distance and orientation of other watercraft in the vicinity. This inability of watercraft operators to determine depth-of-field by observing other watercraft navigational lights can cause watercraft operators to erroneously conclude that navigational lights of other watercraft are lights located on shore. The orientation of watercraft is also difficult to determine from navigational lights because at even minimal distances, blending of the different colored navigational lights tends to occur causing confusion to other watercraft operators. Conventional navigational light assemblies may produce glare off of the windshield of the watercraft hampering the vision of or otherwise distracting the watercraft operator.

Another problem with conventional navigational lighting on watercraft is the inability of the lighting system to communicate the relative motion of the watercraft on the water to observers not on that watercraft. This is an especially significant problem when watercraft are substantially stationary in the water, as occurs when anchored during fishing or other stationary activity, for example.

SUMMARY OF THE INVENTION

In accordance with one aspect of the present invention, an improved watercraft lighting system and method is provided which enhances the visibility of a watercraft at night or during other inclement conditions. This improved boat lighting system is designed to improve the perception of distance and relative motion of a watercraft to other watercraft operators. In one embodiment of the present invention, lights are associated with the watercraft such that the lights directly illuminate at least a substantial portion of the hull located above the waterline of the watercraft thereby providing a distinct, visual indication of the hull of the watercraft to observers at a distance from that watercraft such as in another watercraft or on shore, for example, which permits improved observation of the existence of the watercraft. Preferably, the lighting system also provides some indication of the size, distance, speed, direction and orientation of the watercraft particularly compared to conventional navigational lights. Preferably, the improved watercraft lighting system provides a visual indication of the watercraft at a distance of at least 500 feet, more preferably at one-eighth of a mile, and most preferably of one-half of a mile or more. The distance will, of course, depend on the size of the boat's hull and the intensity of the lighting. As used herein, "observer" or "off-craft observer" means a person generally horizontally spaced 100 feet or more from the watercraft lighted in accordance with the invention, such as a person on another watercraft or on shore, for example, observing with his naked eye.

In another embodiment of the invention, the direction and orientation of the watercraft is more readily discernible by providing that the lights which substantially illuminate the port side of the hull above the waterline emit red light, the lights that substantially illuminate the starboard side of the hull emit green light, and the lights that substantially illuminate the stem of the boat emit white light, or some other variation of colors, as desired. The lights may be appropriately shielded so that substantially only light directed from the light source onto the hull is visible by an observer (such as an observer on another watercraft) at a distance. Thus, the observer views light reflected from the hull. In addition, a lens or lenses may be employed to focus and/or diffuse light onto the hull as desired. The area and intensity of light that illuminates the hull depends on the size of the watercraft and the lighting effect that is desired. Generally at least about 10% or 10 square feet of each of the starboard and port sides of the hull area that is above the waterline should be illuminated by the lighting system of the invention. Bow and/or stem portions may also be illuminated if desired. Preferably a greater area or percentage of hull area will be illuminated such that 25% or 50% and/or at least 25, 50 or 100 square feet or more of the above waterline hull area, that is observable by an off-craft observer (such as an observer on another boat), is illuminated by the lighting system of the present invention.

Another embodiment of the present invention provides a sensor which detects the motion and speed of the watercraft relative to the body of water or to another reference and accordingly activates the boat lighting system to operate in a manner which clearly indicates the direction and rate of motion of the watercraft. The direction of motion can be indicated by the intermittent and sequential activation of separate lights comprising the lighting system advancing in the direction of movement of the watercraft, whereas the rate of motion of the watercraft relative to the body of water or other reference can be indicated by the rate of flashing of the improved watercraft lighting system.

In yet another embodiment of the present invention, a device is provided which intermittently activates and deactivates the watercraft lighting system thereby indicating when the watercraft is in motion or is substantially stationary in the water.

In accordance with another aspect of the invention, a method indicating the presence at night of a watercraft, having a hull that extends above the waterline of the craft, to an off-craft observer is provided. The method includes directing light from a light source mounted to the watercraft onto at least the portion of the above-waterline portion of the hull to cover sufficient hull areas with light and at an intensity sufficient to make the lighted portion observable by the off-craft observer located at a distance from the watercraft of at least about 500 feet or more. In accordance with a related aspect, the method also includes indicating the forward or rearward direction of travel of the watercraft to the off-craft observer. In accordance with this aspect, the method includes sensing the direction of forward and rearward movement of the watercraft and directing light from a plurality of light sources horizontally spaced on at least one side of the hull above the waterline and sequentially flashing the light sources to correspond to and indicate the direction of travel of the watercraft to the off-craft observer. The rate of sequential flashing can be proportional to the speed of the watercraft and thus the relative speed of the watercraft can also be indicated.

The following detailed description will more readily describe and make apparent these and other objects and advantages of the present invention when considered in conjunction with the accompanying drawings.

BRIEF DESCRIPTION OF THE DRAWINGS

FIG. 4 is a front elevation view of the watercraft and improved lighting system illustrated in FIG. 3;

FIG. 5 is a side elevation of a watercraft equipped with another embodiment of the present invention;

FIG. 6 is a front elevation view of the watercraft and improved lighting system depicted in FIG. 5;

FIG. 7 is a side elevation view of a portion of the watercraft illustrating a motion sensor attached to the propeller shaft of the watercraft;

FIG. 8 is a side elevation view of a portion of the watercraft having a motion sensor attached to the underside of the hull of the watercraft;

FIG. 9 is a schematic view of another embodiment of the improved watercraft lighting system provided with a clamping assembly to facilitate attachment of the improved watercraft lighting system to the watercraft; and FIG. 10 is an alternate embodiment of the improved watercraft lighting system utilized by a sailboat.

DETAILED DESCRIPTION OF THE INVENTION

Figure 1:
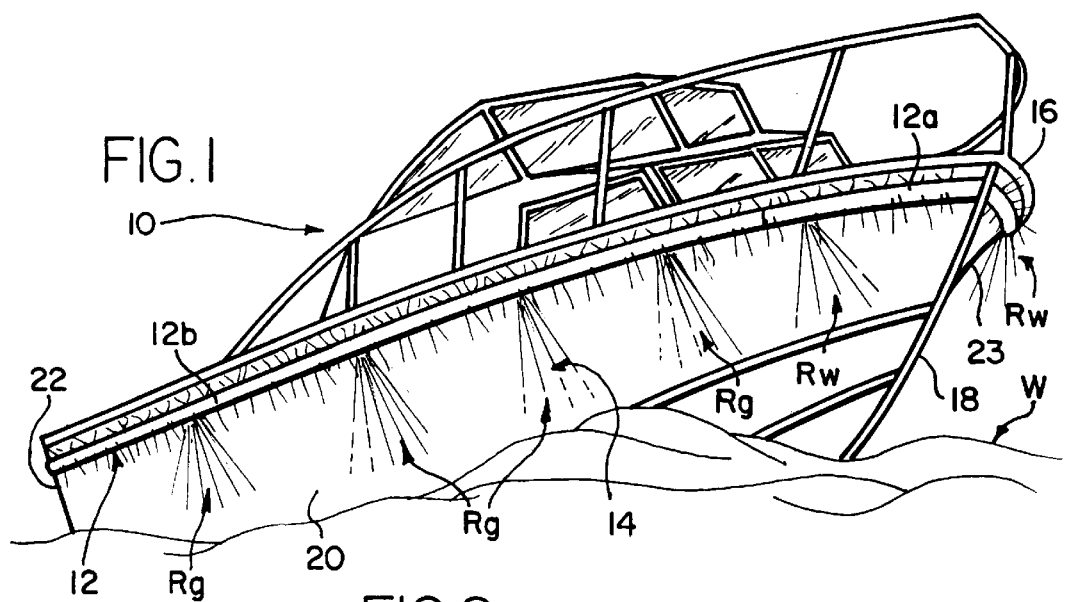
FIG. 1 is a perspective view of a watercraft outfitted with the improved boat lighting system according to the present invention.
Figure 2:
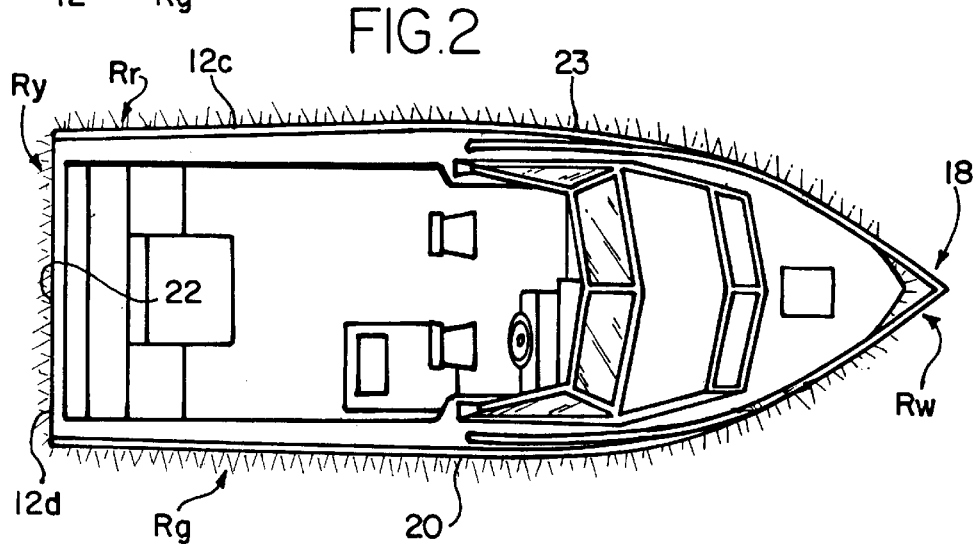
FIG. 2 is a top plan view of the watercraft and lighting system shown in FIG. 1.

Referring first to FIGS. 1 and 2, a watercraft 10 about 35 feet in length, having a hull 14, is shown provided with the present invention, a boat lighting system 12, which is shown positioned on hull 14 below gunwale 16 of watercraft 10 and extends around at least substantially the entire perimeter of the watercraft 10. Hull 14 of watercraft 10 is comprised of a bow portion 18, a starboard portion 20, a stem portion 22 and a port portion 23. Preferably, for use with the invention, hull 14 is white or some other light color for maximum visibility when illuminated. Improved boat lighting system 12 illuminates a significant above the waterline portion of hull 14. In particular, the improved boat lighting system 12 illuminates bow 18 with light rays Rw of white light, starboard portion 20 of hull 14 with light rays Rg of green light and port portion 23 of hull 14 with light rays Rr of red light, and stern portion 22 with light rays Ry of yellow light. A single color or other combination of colors can be utilized in accordance with the invention. A sufficiently large surface area of hull 14 is illuminated with sufficient light intensity to enable watercraft 10 to be readily observable at night by a naked eye observer without difficulty at a relatively long distance, such as one-quarter or one-half mile or more, for example.

Boat lighting system 12 can be a neon or other type of light strips 12a, 12b, 12c and 12d for providing the desired white, green, red and yellow light as previously described. For example, light strips 12a, 12b, 12c and 12d may be composed of a string of high intensity light bulbs contained within a housing (not shown). In addition, lighting system 12 is composed of a source of electricity (not shown) and suitable wiring (not shown) to connect light strips to the electrical source and control device as hereafter described.

Figure 3:
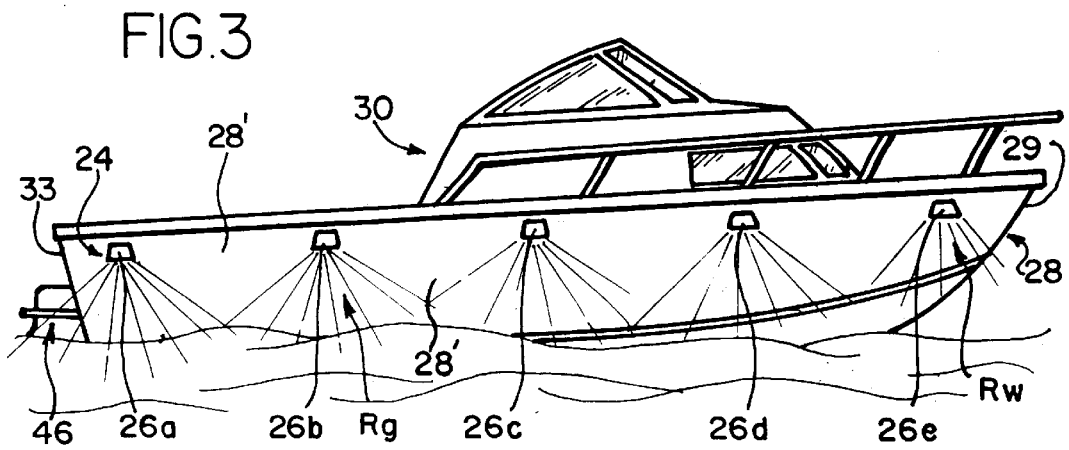
FIG. 3 is a side elevation view of a watercraft equipped with another embodiment of the present invention.

Referring now to FIGS. 3 and 4, an alternate embodiment of the improved watercraft lighting system 24 of the invention is provided which illuminates distinct portions of starboard side 28' of hull 28 as well as the port side (not illustrated) and bow side of watercraft 30. Lighting system 24 is composed of a plurality of horizontally spaced apart lights 26(a)–(m) mounted on an upper portion of hull 28 and oriented to shine light downwardly on hull 28 to illuminate a substantial above water portion thereof. It should be evident that the number of light emitting elements may increase or decrease or otherwise be varied as desired with respect to the total surface area of the hull of the watercraft to be illuminated to provide the desired coverage and intensity. Similarly, the port portion (shown partially in FIG. 4) of hull 28 of watercraft 30 is outfitted with the alternate embodiment of the improved watercraft lighting system 24 in a manner similar to starboard side 28'.

Similar to the embodiment shown in FIG. 1, light emitting elements 26(a)–(e) that illuminate the starboard portion 28' of the hull 28 of the watercraft 30 may emit green light Rg, elements 26(f)–(k) that illuminate the bow portion 29 of the hull 28 may emit white light Rw and those elements, including elements 26(l)–26(m), that illuminate the port portion of the hull 28 of the watercraft 30 may emit red light Rr such that the separate portions of the hull of the watercraft are more distinctly indicated, although any color or colors of light can be utilized. In addition, light elements (not shown), such as light element 26, may be located to illuminate stem portion 33 of hull 28.

FIGS. 5 and 6 show another alternative embodiment of the improved watercraft lighting system whereby a plurality of light emitting elements 32(a)–(m) that illuminate a substantial portion of hull 34 of a watercraft 40 are located at or near the waterline 36 of the hull 34 of the watercraft 40 and direct light upwardly on hull 34. Light emitting elements 32(a)–(m) can be similar to light emitting elements 26(a)–(m), except elements 32(a)–(m) are oriented to direct light upwardly on starboard, bow and port portions 28', 29 and 31, respectively of hull 34. Light elements used in accordance with the invention, such as elements 26(a)–(m) and 32(a)–(m), should be appropriately constructed for exposure to water and the elements, as is known to those skilled in the art.

In accordance with one aspect of the invention, lights can be flashed in sequence to indicate direction to an observer off the watercraft. The rate of flashing can also be varied in proportion to the relative watercraft speed to provide an indication to observers off the watercraft of relative speed. To achieve these features, various sensors and control systems can be utilized.

Any suitable type of sensor to indicate watercraft movement and/or relative speed can be utilized. For example, FIGS. 7 and 8 show alternative types of motion sensors 38 and 48, respectively. In FIG. 7, sensor 38 senses speed and direction of shaft 42 which drives propeller 44 of a stem drive 46 of watercraft 30. In this manner, the speed and direction of watercraft 30 can be determined. The speed and direction data is detected by light system controller 50 through sensor wire 52 which connects sensor 38 and controller 50. Controller 50 determines the direction and frequency of sequential flashing of the system lights and is connected to the system lights in a suitable manner, such as via a suitable electrically conductive wire 54 (only light element 26(a) is shown for convenience), to supply electricity to the system lights at appropriate intervals. Controller 50 may include a microprocessor to perform the control functions for the system lights and switching structure to direct electricity to the lights in a desired sequence. The improved watercraft lighting system, by utilizing data from any suitable motion sensing means, processed by controller 50, can indicate the relative direction of travel and the rate of motion of the watercraft. The direction of motion (for example, forward or backward movement) of the watercraft can be indicated by alternately activating and deactivating portions or elements of the improved watercraft lighting system sequentially, whereas the rate of movement of the watercraft can be indicated by the frequency of the activation and deactivation of the portions or elements of the improved watercraft lighting system. For example, forward movement of the watercraft can be indicated by activating the portions or elements of the improved lighting system in sequence starting at the stern portion of the boat (lighting element 26(a), for example) and moving towards the bow portion of the boat (ending with lighting element 26(h), for example). Alternatively, the portion or elements of the light which start the sequence may remain activated or deactivate upon activation of the next portion or element of the lighting system. Moreover, when the motion sensor senses that the watercraft is substantially stationary in the water, the watercraft lighting system can alternately activate and deactivate to indicate that the watercraft is substantially motionless, such as with all lights periodically flashing on and off at the same time, for example.

Alternatively, the transmission position of the motor of the watercraft can signal the improved watercraft lighting system to provide the indication of the direction of motion, or lack thereof, of the watercraft as previously described.

Referring to FIG. 9, a lighting element 56 useful with the watercraft lighting system of the invention is shown attached to the hull 60 of a boat utilizing a conventional clamping assembly 58 which allows for attachment or removal of the improved lighting system from the watercraft. Clamping assembly 58 includes a clamping jaw 62 and a threaded member 64 for tightening jaw 62 against hull 60. This embodiment of the watercraft lighting system is useful as an aftermarket add-on device for watercraft not originally equipped with the watercraft lighting system of the present invention. This embodiment is also useful to owners of multiple watercraft in terms of interchangeability and for ease of repair and/or maintenance of the watercraft lighting system in certain instances. Lighting element 56 is configured to project light R downwardly against the side of hull 60. As illustrated, lighting element 56 includes a light bulb or source 66, a lens 68 to focus and diffuse light R onto the surface of hull 60, and a housing 70 which contains light bulb 66 mounted and contained therein in an enclosed waterproof manner. Bulb 66 is connected to an electrical source (not shown). Housing 70 is opaque and thus also acts as a light shield, preventing off-craft observers from directly viewing light from bulb 66 (the observer sees light R directed onto hull 60).

FIG. 10 shows yet another embodiment of a watercraft lighting system 72 utilized by a sailboat 74. Lighting system 72 is similar to lighting system 12 previously described.

The positioning of the improved watercraft lighting system on or about the watercraft is not critical as long as a substantial portion of the hull of the watercraft can be illuminated with sufficient intensity to permit observation by a distant observer.

Illumination of a substantial portion of the hull of the watercraft by the improved watercraft lighting system in accordance with the invention can be achieved either through direct or indirect illumination. Indirect illumination may be achieved through reflective focusing of the light emitted from the light emitting element, for example.

Providing the improved watercraft lighting system to illuminate different sections of the hull allows for easier visual indication of the orientation of the watercraft relative to the perspective of the observer. Specifically, the observer would be able to determine the orientation of the watercraft equipped with the improved watercraft lighting system by observing the color of the portion of the hull which is illuminated. Moreover, by illuminating a large portion of the hull with the watercraft lighting system, a discernible profile of the hull of the watercraft is apparent and provides observers, particularly in other watercraft at a distance with a visual indication of the orientation and size of the watercraft regardless of the color of the illuminated portion of the hull of the watercraft. Providing a discernible profile of the whole of the watercraft utilizing the improved watercraft lighting system helps to mitigate the blending effect of the differently colored illuminated portions of the hull when viewed from a distance. Likewise, because substantial portions of the hull may be illuminated by different colors of light, as opposed to the use of conventional point light sources, the blending of the differently colored lights when viewed from a distance is substantially lessened.

Because the whole of the hull can be substantially illuminated by the improved watercraft lighting system, the direction and rate of movement of the watercraft is also more readily discernible to an observer of the watercraft. This illumination of a significant portion of the hull of the watercraft makes the watercraft stand out during darkness and inclement weather conditions as the substantially illuminated hull appears to be framed by the darker surroundings of the watercraft. Likewise, as the hull of the watercraft can be substantially illuminated, enough ambient light may reflect off of the hull of the watercraft and/or the water which appears as a halo of light surrounding the watercraft which further helps to highlight the position, orientation and movement of the watercraft. Alternatively, this halo effect can be improved by providing that the light emitted by the improved watercraft lighting system illuminates a portion of the water surrounding the hull of the watercraft.

The above described embodiments of the invention are intended to be illustrative only and should not be considered to limit the invention as set forth in the following claims. It will be understood that the invention is capable of numerous changes, modifications and rearrangements and such changes, modifications and rearrangements are intended to be within the scope of the following claims.

What is claimed is:

1. A lighting system for a watercraft having a hull that extends above the waterline comprising:
at least one light source mounted on said watercraft and positioned to direct light onto an above waterline portion of the hull so as to illuminate said portion of the hull and make the illuminated portion of the hull observable at night by an off-craft observer located at a distance from the watercraft.

2. The lighting system of claim 1 wherein the hull has starboard and port sides, and at least a portion of each of said sides above the waterline is illuminated by said light source.

3. The lighting system of claim 2 wherein said light source comprises a plurality of lights on each of the starboard and port sides of said hull.

4. The lighting system of claim 3 further comprising means for sensing movement of said watercraft associated with a control system for said light source, said control system causing said light source to flash sequentially to indicate the direction of forward or backward movement of said watercraft.

5. The lighting system of claim 4 wherein all of the light sources flash simultaneously when the watercraft is not undergoing forward or backward movement.

6. The lighting system of claim 4 wherein said lights are horizontally spaced apart along starboard and port sides of the hull.

7. The lighting system of claim 6 wherein the light illuminating the starboard side is green and the light illuminating the port side is red.

8. The lighting system of claim 6 wherein the lights flash sequentially from the rear to the front of the watercraft to indicate forward motion of the watercraft and from the front to the rear of the watercraft to indicate backward motion of the watercraft.

9. The lighting system of claim 3 wherein the light source is colored to indicate different sections of the watercraft.

10. The lighting system of claim 3 wherein the individual light source that illuminates the stem portion of the hull is white, the individual light source that illuminates the starboard portion of the hull is green, and the individual light source that illuminates the port portion of the hull is red, thereby providing a visual indication of the orientation of the watercraft at a distance.

11. The lighting system of claim 1 wherein the light source is shielded to prevent an off-craft observer from directly viewing the light source.

12. The lighting system of claim 1, wherein the light source is located at an upper portion of the hull of the watercraft and directs light downwardly to illuminate a portion of the hull of the watercraft below the light element.

13. The lighting system of claim 1, wherein the light source is located at a lower portion of the hull above the waterline and directs light upwardly to illuminate a portion of the hull of the watercraft above the light element.

14. The system of claim 1 wherein a hull area of at least about 25 square feet is illuminated by the light directed onto the hull.

15. The system of claim 1 wherein a hull area of at least about 50 square feet is illuminated by the light directed onto the hull.

16. The system of claim 1 wherein a hull area of at least about 100 square feet is illuminated by the light directed onto the hull.

17. A method of indicating the presence of a watercraft having a hull that extends above the waterline to an off-craft observer at night from a distance comprising:
directing light from a light source mounted to the watercraft onto at least a portion of the above-waterline portion of the hull covering sufficient hull area and at an intensity sufficient to make the illuminated portion observable by the off-craft observer located at a distance from the watercraft of at least about 500 feet.

18. The method of claim 17 further comprising sensing the direction of forward or backward movement of the watercraft and directing light from a plurality of horizontally spaced light sources on at least one side of the hull above the waterline and sequentially flashing said light sources to indicate the direction of travel of the watercraft to the off-craft observer.

19. A lighting system for a watercraft having a hull that extends above the waterline comprising:
at least one light source mounted on said watercraft and positioned to illuminate an above the waterline portion of the hull so as to make the illuminated portion of the watercraft observable at night by an off-craft observer located at a distance from the watercraft; said hull has starboard and port sides, and at least a portion of each of said sides above the waterline is illuminated by said light source, said light source comprising a plurality of lights on each of the starboard and port sides of said hull; said lights are horizontally spaced apart along starboard, bow and port sides of the hull; and
a means for sensing movement of said watercraft associated with a control system for said light source, said control system causing said light source to flash sequentially to indicate the direction of forward and backward movement of said watercraft; said lights flash sequentially from the rear to the front of the watercraft to indicate forward motion of the watercraft and from the front to the rear to indicate backward movement of the watercraft; the rate of flashing is proportional to the speed of forward or backward movement of the watercraft.

20. The system of claim 18 wherein a hull area of at least about 25 square feet is illuminated by the light directed onto the hull.

21. A method of indicating the presence of a watercraft having a hull that extends above the waterline to an off-craft observer at night from a distance comprising:
directing light from a light source mounted to the watercraft onto at least a portion of the above-waterline portion of the hull covering sufficient area and at an intensity sufficient to make the illuminated portion observable by the off-craft observer located at a distance from the watercraft of at least about 500 feet; sensing the direction of forward or backward movement of the watercraft and directing light from a plurality of horizontally spaced light sources on at least one side of the hull above the waterline; sequentially flashing said light sources on at least one side of the hull above the waterline and sequentially flashing said light sources to indicate the direction of travel of the watercraft to the off-craft observer wherein the rate of flashing is proportional to the speed of the watercraft.

22. The system of claim 19 wherein a hull area of at least about 25 square feet is illuminated by the light directed onto the hull.

* * * * *

UNITED STATES PATENT AND TRADEMARK OFFICE
CERTIFICATE OF CORRECTION

PATENT NO. : 6,231,217 B1
DATED : May 15, 2001
INVENTOR(S) : Jacob Krippelz Sr.

It is certified that error appears in the above-identified patent and that said Letters Patent is hereby corrected as shown below:

Column 2,
Lines 29 and 42, delete "stem" and insert therefor -- stern --.

Column 4,
Line 51, delete "stem" and insert therefor -- stern --.

Column 5,
Line 10, delete "stem" and insert therefor -- stern --.

Column 7, claim 10,
Line 42, delete "stem" and insert therefor -- stern --.

Column 8, claim 20,
Line 41, delete "18" and insert therefor -- 19 --.

Column 8, claim 22,
Line 62, delete "19" and insert therefor -- 21 --.

Signed and Sealed this

Twenty-sixth Day of February, 2002

Attest:

JAMES E. ROGAN
Attesting Officer *Director of the United States Patent and Trademark Office*